(12) United States Patent
Stidham et al.

(10) Patent No.: US 7,950,568 B2
(45) Date of Patent: May 31, 2011

(54) EXOTHERMIC WELDING ASSEMBLY

(75) Inventors: Curtis R. Stidham, Medina, OH (US); Mark S. Harger, Libertyville, IL (US)

(73) Assignee: Harger, Inc., Grayslake, IL (US)

( * ) Notice: Subject to any disclaimer, the term of this patent is extended or adjusted under 35 U.S.C. 154(b) by 378 days.

(21) Appl. No.: 11/969,572

(22) Filed: Jan. 4, 2008

(65) Prior Publication Data

US 2009/0173873 A1  Jul. 9, 2009

(51) Int. Cl.
*B23K 31/02* (2006.01)
*B28B 7/24* (2006.01)

(52) U.S. Cl. ........... 228/234.3; 164/53; 164/54; 249/83; 249/121

(58) Field of Classification Search ............... 228/234.3, 228/33; 164/53, 54; 249/83, 121
See application file for complete search history.

(56) References Cited

U.S. PATENT DOCUMENTS

| | | | |
|---|---|---|---|
| 4,879,452 A * | 11/1989 | Kovarik et al. | 219/130.4 |
| 5,145,106 A * | 9/1992 | Moore et al. | 228/234.3 |
| 5,279,455 A | 1/1994 | Fuchs | |
| 5,715,886 A | 2/1998 | Fuchs | |
| 6,382,496 B1 * | 5/2002 | Harger | 228/44.3 |
| 6,553,911 B1 | 4/2003 | Walker et al. | |
| 6,776,386 B1 * | 8/2004 | Morrissey et al. | 249/97 |
| 6,793,003 B2 | 9/2004 | Triantopoulos et al. | |
| 6,994,244 B2 | 2/2006 | Harger et al. | |
| 7,240,717 B2 * | 7/2007 | Lofton | 164/54 |
| 2004/0003907 A1 | 1/2004 | Moore et al. | |

OTHER PUBLICATIONS

Harger "Harger Lightning and Grounding—Master Equipment Catalog," Issue 1/02, pp. 1-8, 243 and 250-253.
"Low Emissions Welded Connection Satisfies Clean Room Requirements" Electrical Construction and Maintenance, Sep. 1992, cover and 3 unnumbered pages.

* cited by examiner

*Primary Examiner* — Kevin P Kerns
*Assistant Examiner* — Devang R Patel
(74) *Attorney, Agent, or Firm* — Cook Alex Ltd.

(57) ABSTRACT

An assembly is disclosed for exothermic welding comprising a mold which is formed of a material which withstands exothermic welding temperatures and includes a weld cavity therein for positioning at least two members which are to be exothermically welded together, and an ignition cavity communicating with the weld cavity. The mold is capable of accommodating any one of several exothermic welding procedures which may involve either a flint igniter or the use of an electrical igniter which is readily accommodated by the mold in the performance of several of the procedures. The electrical igniter is formed of a pair of flat, longitudinally extending conductor strips with a sheet of insulation laminated therebetween, a filament adjacent one end of the strips, and one or more positioning tabs adjacent one end of the strips. A cartridge is also provided which contains the weld metal and the electrical igniter and which may be positioned in the ignition cavity of the mold. The cartridge is formed of a material which is consumed during the welding procedure and may contain a plate of a different material adjacent its bottom which melts at a higher temperature than the materials of the cartridge.

9 Claims, 5 Drawing Sheets

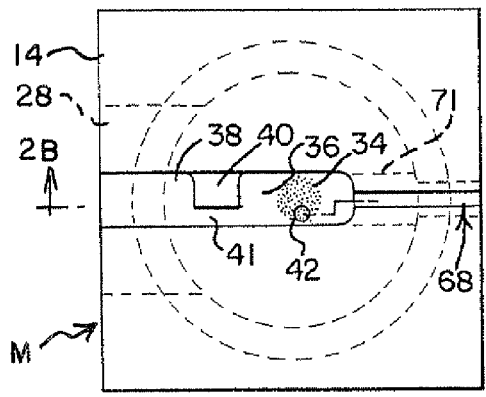
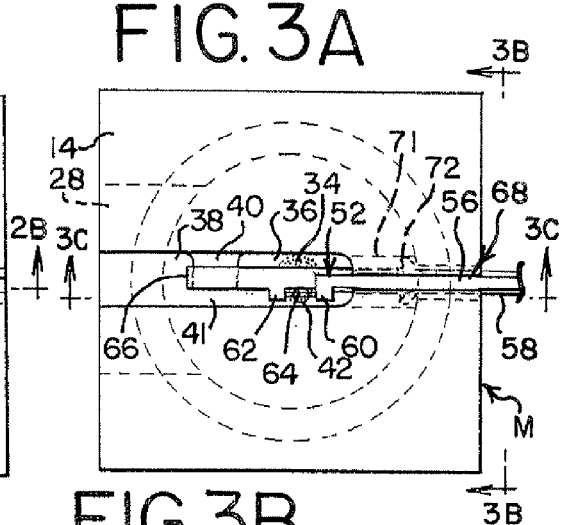
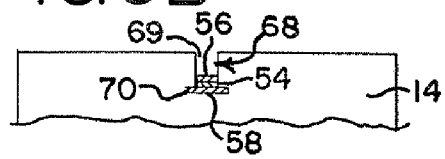
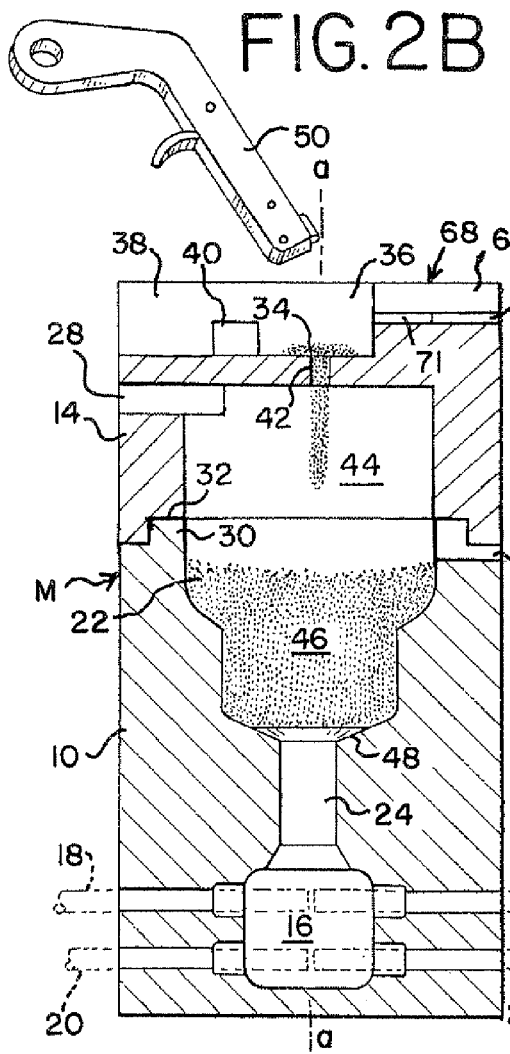
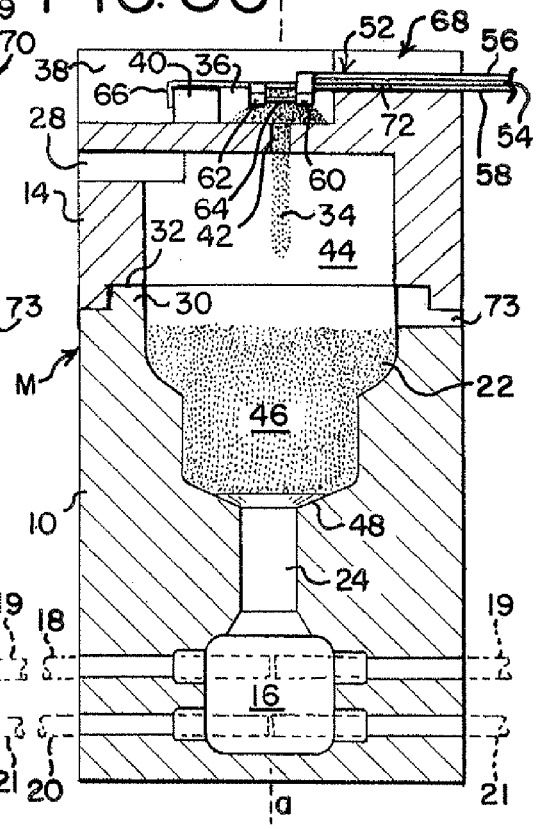

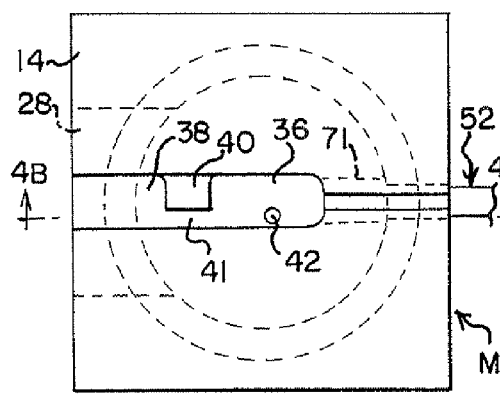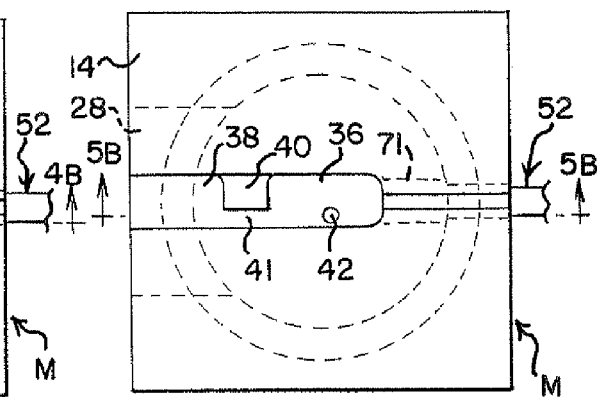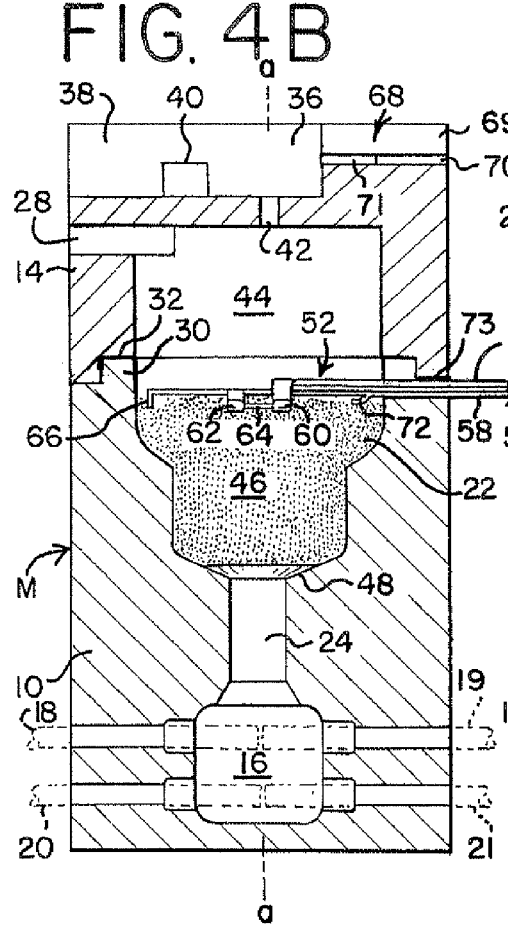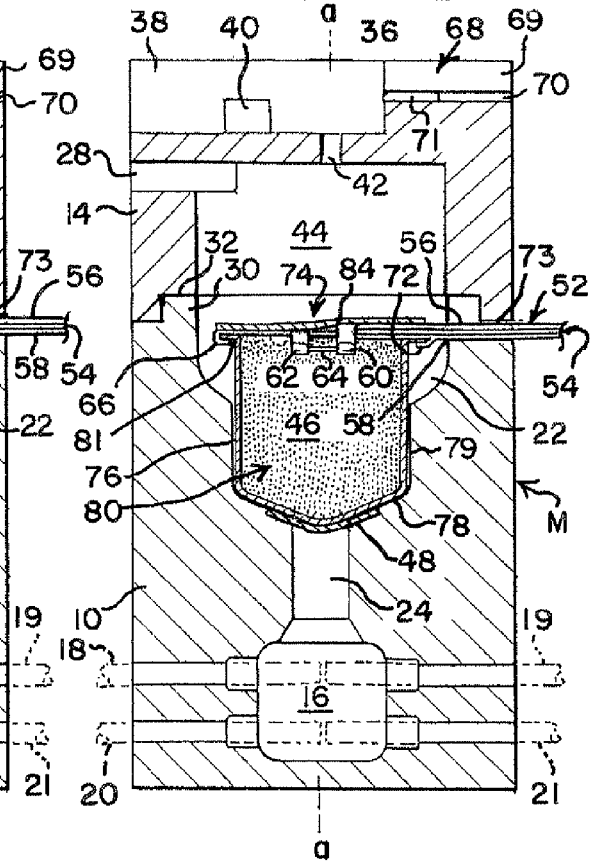

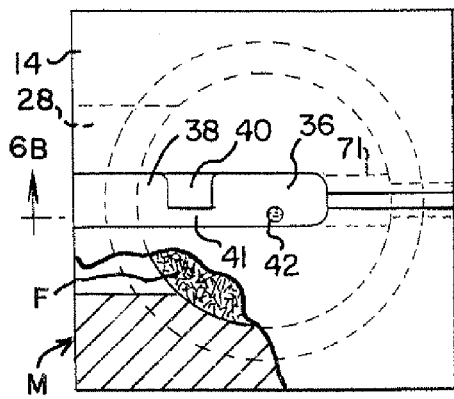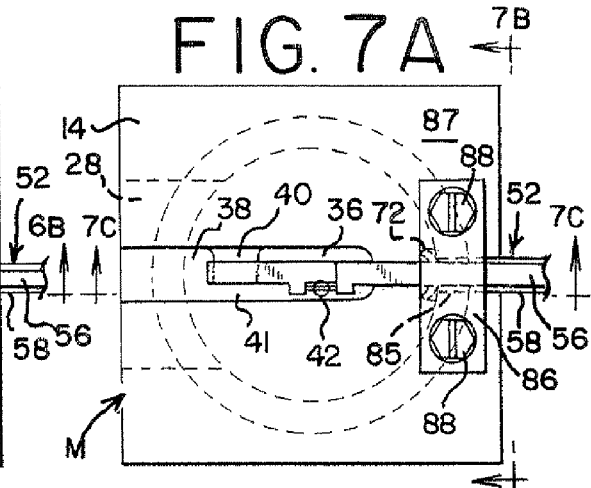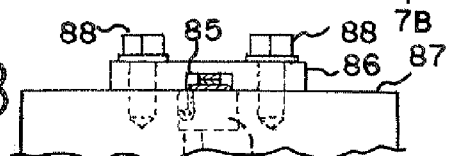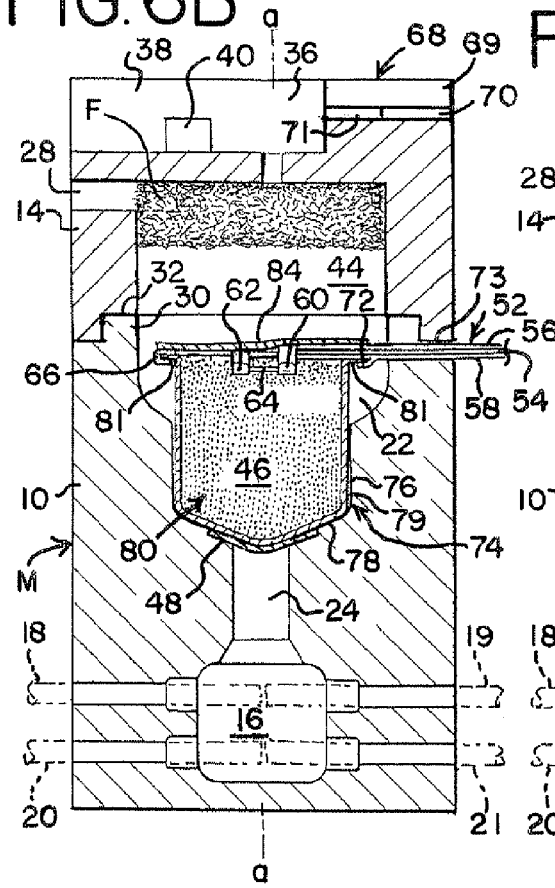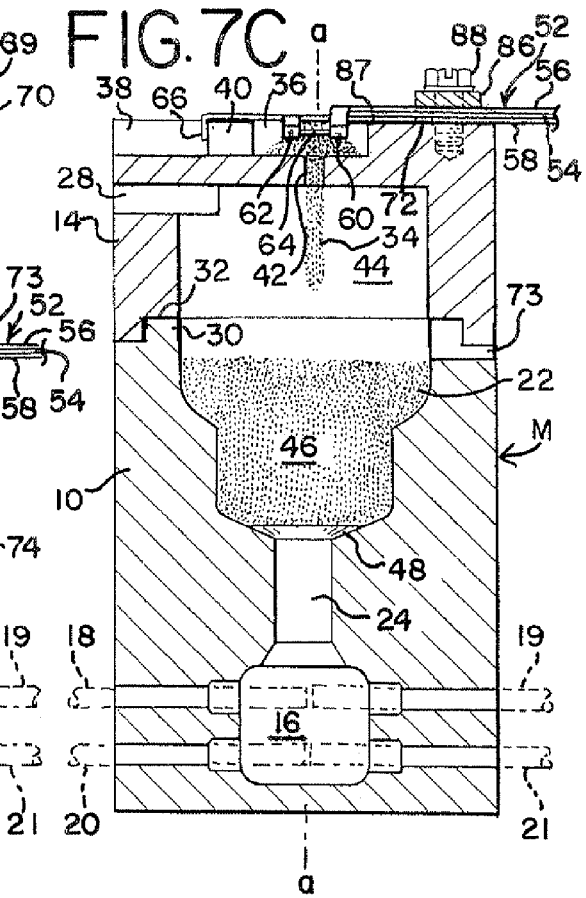

EXOTHERMIC WELDING ASSEMBLY

BACKGROUND AND SUMMARY OF THE INVENTION

The present invention relates to exothermic welding and an improved assembly, weld metal cartridge and igniter therefor.

Exothermic welding has been employed in the past as an effective method of welding two or more members together which may be copper and/or steel, such as cables to cables, cables to ground rods, cables to steel surfaces including plates and pipes, cables to bus bars, cables to rebar and the like. Such exothermic welding eliminates the need for an outside source of heat or power and produces a permanent, corrosion resistant weld which cannot loosen and does not increase electrical resistance.

In exothermic welding a particulate weld metal is employed which is a mixture of copper oxide and aluminum which, when ignited, produces the following chemical reaction:

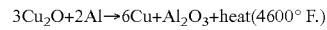

$$3Cu_2O+2Al \rightarrow 6Cu+Al_2O_3+heat(4600° F.)$$

To accomplish such welds the members to be welded together are positioned adjacent to each other utilizing a weld cavity in a mold formed of a material, such as graphite, which is capable of withstanding the extremely high temperatures of the exothermic welding process. Another ignition cavity in the mold contains a loose particulate weld metal which is to be ignited to initiate the welding process. A metal disk, which typically is a tin plated steel, is first positioned in the ignition cavity to prevent the loose particulate weld metal from flowing into the welding cavity in which the materials are to be welded together prior to ignition. The loose particulate weld metal is then poured into the ignition cavity, and the mold cover is closed. In order to initiate ignition, a spark generator ignites the loose particulate weld metal which melts in the ignition cavity to melt the metal disk and the molten weld metal flows from the ignition cavity into the weld cavity to weld the members together.

In another prior exothermic welding procedure as disclosed for example in U.S. Pat. No. 6,994,244, a weld metal cartridge comprising a container which contains the weld metal is placed in the ignition cavity of the mold, and an igniter formed of electrical conductors is positioned in the weld metal in the container. When an electrical current is passed through the conductors, the igniter heats to ignite the weld metal, and the molten weld metal flows from the ignition cavity into the weld cavity to weld the members together. In this procedure, the container may be formed of a metal, such as copper, which also melts with the weld metal and flows with the molten weld metal to the weld cavity. The container may also be formed of other metals, such as steel. However, even though the steel bottom of the container may achieve a sufficient temperature to melt when the weld metal is melted, the steel side walls may not, thereby leaving a residue which must be removed from the ignition cavity before the mold can be reused to perform another welding procedure.

In still another prior exothermic welding procedure, ignition of the loose particulate weld metal in the ignition cavity is initiated by first igniting a starting powder which ignites quickly and at a lower ignition temperature than the ignition temperature of the weld metal. This starting material may be a more finely ground form of the weld metal and may be located in a depression in the cover of the mold where it can be ignited by a spark from a flint igniter. After ignition, the molten starting material flows through the cover and into the weld metal in the ignition cavity of the mold to ignite and melt the weld metal in the ignition cavity.

Smokeless exothermic welding procedures are also currently available for exothermic welding in clean room environments. In such smokeless procedures a filter is employed with the mold to trap most of the emissions created in the exothermic welding process while allowing the heated air to escape through the filter.

It would be desirable if an exothermic welding mold existed which was capable of accommodating at least each of these several exothermic welding procedures as well as others, and which would avoid the need for maintaining an inventory of different molds in order to enjoy the specific advantages of each procedure.

It would also be desirable if the mold was capable not only of accommodating the performance of each of these exothermic welding procedures, but could also accommodate the smokeless exothermic welding procedures discussed above.

In one principal aspect of the present invention, an exothermic welding assembly, comprises a mold formed of a material which withstands exothermic welding temperatures and which has an elongate axis. The mold includes a first portion having a first cavity therein for positioning at least two members adjacent each other which are to be exothermically welded together, and a second portion comprising a mold cover. A second cavity is present in the mold for containing a weld metal. The second cavity communicates with the first cavity and has a first vent passage extending therefrom to the exterior of the mold to vent gases from the second cavity. A depression is located in the mold cover for containing a starting material for the initiation of the reaction of the weld metal. The depression in the mold cover opens to the top of the mold cover, and a second passage extends between the depression and the second cavity in the mold to communicate the starting material when ignited with the weld metal in the second cavity. A third passage is also associated with the mold and which extends at a substantial angle to the elongate axis from a side of the mold and toward the elongate axis of the mold and the depression.

In still another principal aspect of the present invention, in the assembly the third passage extends through the cover and from the side of the mold into the depression, and the third passage is constructed and arranged to receive an electrical igniter and contain it in the third passage so that the igniter can extend from outside of the mold into the depression.

In another principal aspect of the present invention, in the assembly the third passage extends along the top of the cover and from the side of the mold toward the depression, and the third passage is constructed and arranged to receive an electrical igniter and contain it in the third passage so that the igniter can extend from a side of the mold into the depression.

In still another principal aspect of the present invention, the assembly includes a fourth passage which extends at a substantial angle to the elongate axis from a side of the mold and toward the elongate axis between the first portion of the mold and the cover and from the side of the mold and into the second cavity, and the fourth passage is also constructed and arranged to receive an electrical igniter and contain it in the fourth passage so that the igniter can extend from outside of the mold into the second cavity and the weld metal therein.

In still another principal aspect of the present invention, the assembly includes a container in the second cavity in the mold which contains the weld metal, and an electrical igniter has one end positioned in the container and in the weld metal therein, and the other end extends laterally from the container and through the fourth passage to the outside of the mold.

In still another principal aspect of the present invention, the container includes a cover on the container, and the igniter extends laterally from the container and from beneath the cover.

In still another principal aspect of the present invention, the assembly includes a filter in the mold between the second cavity and the first vent passage.

In still another principal aspect of the present invention, a weld metal cartridge for exothermic welding comprises a container having a top, a side wall and a bottom with the side wall and bottom defining a chamber therein. A particulate weld metal is in the chamber, and a cover covers the top and retains the particulate weld metal in the chamber and the said side wall of the container is positioned relative to the particulate weld metal and is formed of a material so that the side wall melts with the particulate weld metal during the welding procedure. A plate of material is located adjacent the bottom which is formed of a material which melts at a higher temperature than the material of the side wall.

In still another principal aspect of the present invention, the material of the side wall comprises copper and/or the plate comprises steel, and the plate may be a disk which covers a substantial area of the bottom.

In still another principal aspect of the present invention, the container includes a bottom wall and the disk is fixed to the bottom wall.

In still another principal aspect of the present invention, an electrically conductive igniter has one end thereof in the chamber of the container beneath the cover and adjacent the weld metal, and an opposite end of the igniter extends from the container and from beneath the cover, whereby the end of the igniter in the container ignites the weld metal upon passage of an electrical current through the igniter.

In still another principal aspect of the present invention, an igniter for igniting a particulate exothermic weld metal, comprises a pair of flat, longitudinally extending electrical conductor strips, and a sheet of insulation is laminated between the electrical conductor strips to insulate the electrically conductive strips from each other. An ignition element comprising a filament is located adjacent one end of the electrical conductor strips and electrically connected to the strips, and the filament is formed of a material which heats substantially when electricity is passed therethrough to a temperature sufficient to ignite the exothermic weld metal. The other end of the electrical conductor strips is adapted to be coupled to a source of electrical power sufficient to cause the filament to heat to ignite the particulate exothermic weld metal.

In still another principal aspect of the present invention, the filament material is tungsten and/or the insulation is an aromatic polyamide.

In still another principal aspect of the present invention, at least one positioning tab is located adjacent the one end of one of the strips for positioning the filament prior to ignition of the particulate exothermic weld metal, and the positioning tab may be constructed and arranged to couple the igniter to the top of a container for containing the particulate exothermic weld metal.

In still another principal aspect of the present invention, at least two positioning tabs are spaced from each other on one end of one of the strips and they may be constructed and arranged to couple the igniter to the top of a container for containing the particulate exothermic weld metal.

In still another principal aspect of the present invention, one of the electrical conductor strips is narrower in width than the other.

These and other objects, features and advantages of the present invention will be more clearly understood through a consideration of the following detailed description.

BRIEF DESCRIPTION OF THE DRAWINGS

In the course of this description reference will be frequently made to the attached drawings in which:

FIG. 2A is a plan view of the mold assembly as substantially shown in FIG. 1;

FIG. 2B is a cross sectioned elevation view of the mold assembly shown in FIG. 2A and as viewed substantially along line 2B-2B of FIG. 2A, and in which a welding procedure is shown in which a starting material is ignited by the spark of a flint igniter;

FIG. 3A is a plan view of the mold assembly as substantially shown in FIG. 1;

FIG. 3B is a side elevational view of the cover of the mold assembly as viewed substantially along line 3B-3B of FIG. 3A;

FIG. 3C is a cross sectioned elevation view of the mold assembly shown in FIG. 3A and as viewed substantially along line 3C-3C of FIG. 3A, and in which a welding procedure is shown in which a starting material is ignited by an electrical igniter;

FIG. 4A is a plan view of the mold assembly as substantially shown in FIG. 1;

FIG. 4B is a cross sectioned elevation view of the mold assembly as viewed substantially along line 4B-4B of FIG. 4A, and in which a welding procedure is shown in which loose weld metal is ignited in the ignition cavity by an electrical igniter therein;

FIG. 5A is a plan view of the mold assembly as substantially shown in FIG. 1;

FIG. 5B is a cross sectioned elevation view of the mold assembly as viewed substantially along line 5B-5B of FIG. 5A, and in which a welding procedure is shown in which the weld metal is in a cartridge placed in the ignition cavity and which is ignited by an electrical igniter in the cartridge;

FIG. 6A is a plan view of the mold assembly as substantially shown in FIG. 1;

FIG. 6B is a cross sectioned elevation view of the mold assembly as viewed substantially along line 6B-6B of FIG. 6A, and in which a smokeless welding procedure employing the cartridge as shown in FIG. 5 is employed;

FIG. 7A is a plan view of a second preferred embodiment of exothermic welding mold assembly of the present invention;

FIG. 7B is a side elevation view of the cover of the mold assembly as viewed substantially along line 7B-7B of FIG. 7A;

FIG. 7C is a cross sectioned elevation view of the mold assembly shown in FIG. 7A as viewed substantially along line 7C-7C of FIG. 7A;

DESCRIPTION OF THE PREFERRED EMBODIMENTS

Figure 1:
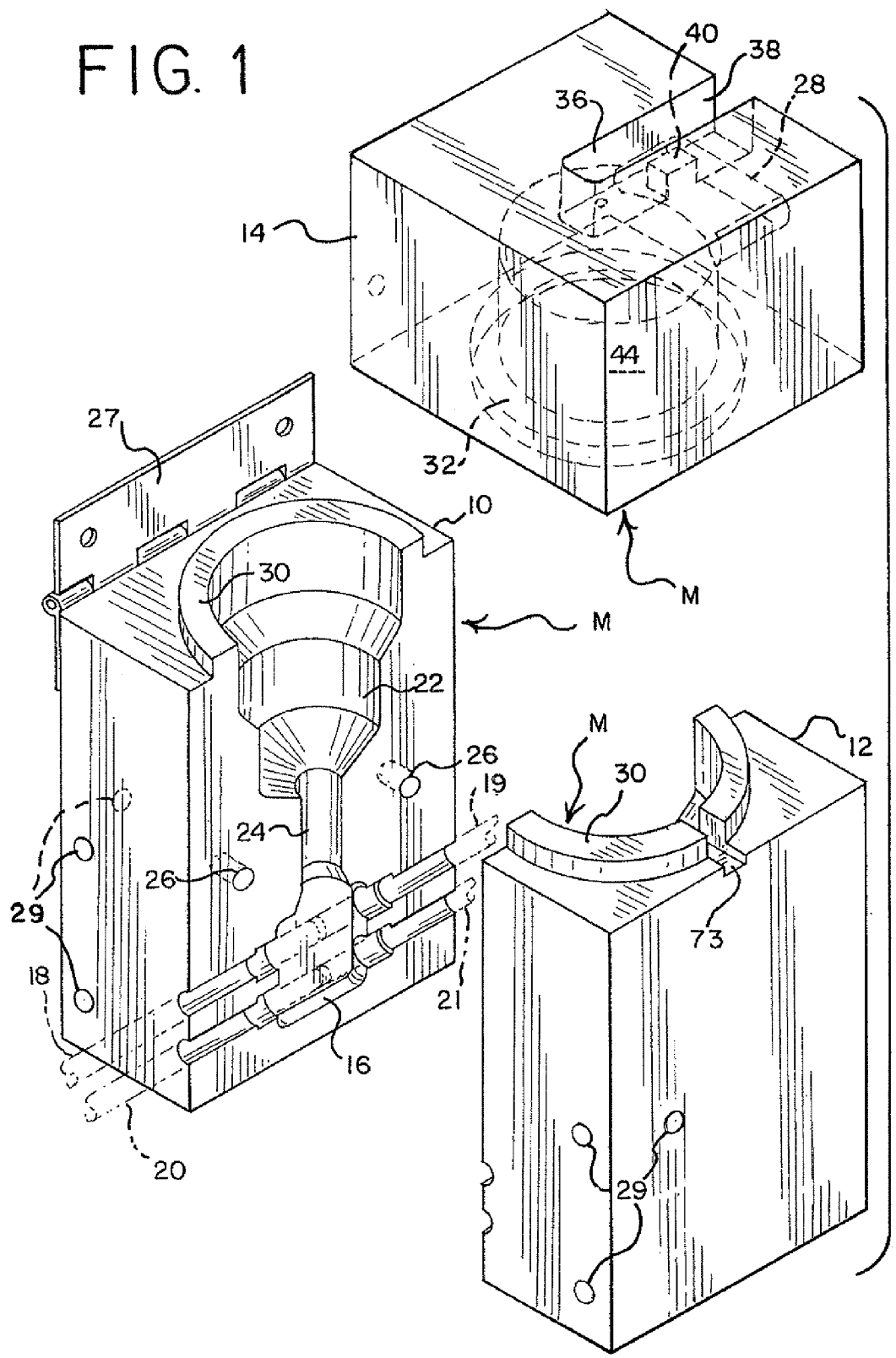
FIG. 1 is an overall perspective, exploded view of a preferred embodiment of exothermic welding mold assembly of the present invention.

With particular reference to FIG. 1, a preferred embodiment of exothermic welding assembly of the invention and for practicing the welding procedures of the invention comprises a mold M formed of a suitable material, such as graphite, for withstanding the extremely high temperatures of the exothermic welding process. The mold M as typically employed in exothermic welding is comprised of two mold halves 10 and 12 and a cover 14 as shown in FIG. 1. Mold half 10 includes one half of a weld cavity 16 which, for example as shown in FIG. 1, receives members, such as cables 18, 19, 20 and 21, to position the cables in a closely adjacent relationship to each other to be exothermically welded together in the weld cavity 16. Although the members 18-21 as shown in the drawings as the members to be welded together are cables, the members may be plates, pipes, rebar, etc., or combinations thereof and the weld cavity 16 may open to a face of the mold M to accommodate such other shapes for example as shown in U.S. Pat. No. 6,382,496 which is incorporated herein in its entirety by reference. And although four cables 18, 19, 20 and 21 are shown as being welded together it will be understood that the number of cables may be fewer of greater than four.

Mold half 10 also includes a second vertically extending one half ignition cavity 22 which opens to the top of mold half 10 as seen in FIG. 1. Cavities 16 and 22 are connected by a passage 24 which permits the molten exothermic weld metal to flow between the ignition cavity 22 to the weld cavity 16 to weld the members 18, 19, 20 and 21 together in the welding process.

Although not fully shown in the drawings, the side of the other mold half 12 which faces mold half 10 includes the other complementary half of weld cavity 16, ignition cavity 22 and passage 24 to complete the cavities and passage when the mold halves are assembled together.

In addition, a pair of guide recesses 26 extend from the face of the mold half 10 which faces mold half 12 to receive complementary guide pins (not shown) on mold half 12 to assure accurate alignment of the mold halves when they are assembled together. Although the recesses 26 are shown extending from the face of mold half 10 into the mold half, the location of the recesses can be reversed without departing from the invention, i.e. the recesses 26 may be positioned on mold half 12 and pins on mold half 10.

The mold M is completed by the cover 14 which covers the ignition cavity 22 when the exothermic reaction is to be initiated. The cover 14 is preferably hinged to mold half 10 by a hinge 27 as shown in FIG. 1. The cover also includes a vent passage 28 which extends from one side of the cover 14 to over the ignition cavity 22 to permit venting of the gases and heat generated during the exothermic welding procedure.

As in typical exothermic welding molds, the two mold halves 10 and 12 are held together by a suitable handle clamp (not shown). Accordingly, recesses 29 are shown on mold in FIG. 1 to accommodate the handle clamp. A suitable clamping arrangement is shown in the aforementioned U.S. Pat. No. 6,382,496.

The mold halves 10 and 12 may also include an annular projection 30 which is adapted to fit into a complimentary annular groove 32 in the mold cover 14 to more securely hold the mold halves together during the welding procedure. It will be appreciated that the location of the projection 30 and groove 32 may be reversed if desired, i.e. the projection 30 may be on the cover 14 and the groove 32 on the mold halves 10 and 12.

Thus far, the mold which has been described is essentially conventional in the exothermic welding art.

In the preferred embodiment of the present invention the exothermic welding mold M is constructed to be readily compatible with anyone of a number of different welding procedures. Thus, the number of molds that need to be kept in inventory to accomplish individual and different welding procedures is substantially reduced if not eliminated altogether and only a single mold construction need be employed.

The construction and use of the mold assembly of the invention for one such exothermic welding procedure is shown in FIGS. 2A and 2B. In this procedure, a fine particulate starting material 34 is placed in a depression 36 in the top of the mold cover 14 as seen in FIGS. 2A and 2B. The depression 36 is formed in the cover 14 of the mold and opens to the top of the cover so that it may be accessed from the top of the cover for placement of the starting material 34 therein, and to permit ignition of the starting material by a spark from a flint igniter. The starting material 34 may simply comprise the weld metal which is to ultimately form the weld, but in a more finely divided form so that it ignites quicker and at a lower temperature than the weld metal.

As shown in FIGS. 2A and 2B, the depression 36 may take the form of an elongate groove 38 which is formed in the cover 14 and which preferably extends and opens to one side of the cover, but does not extend all the way across the cover to the other side of the cover as seen in FIGS. 2A and 2B. The depression 36 may be further defined by a projection 40 which extends from one of the sides of the groove 38, but stops before reaching the other side of the groove to form a space 41. This construction including the space 41 permits any debris which might be left in the depression 36 following the completion of the weld procedure to be easily removed from the depression by a brush or the like. Space 41 also serves another function in one of the other weld procedures to be later described.

The depression 36 also contains a substantially vertical passage 42 extending between the depression 36 and a chamber 44 in the cover 14, and the chamber 44 communicates directly with the ignition cavity 22. The passage 42 permits the molten starting material 34 after it has been ignited to flow into the ignition cavity 22 as seen in FIG. 2B and ignite the particulate weld metal 46 in the ignition cavity. The weld metal 46 prior to ignition is held in the ignition cavity 22 and prevented from passing through passage 24 by a tin plated steel disk 48 or disk of other suitable material which may be consumed by the molten weld metal and become part of the weld.

In order to perform the welding procedure using the mold assembly as shown in FIGS. 2A-2B, the cables 18, 19, 20 and 21 which are to be welded together in the procedure are placed in one half of the weld cavity 16 of either mold half 10 or 12 and the mold halves are clamped together to form the bottom portion of the mold M. When the mold halves 10 and 12 are clamped together, they define the complete ignition cavity 22 and weld cavity 16, and the cables are held, in position in readiness to be welded together in the weld cavity. Now that the ignition cavity 22 is formed and complete, the disk 48 is placed in the bottom of the ignition cavity 22 and the ignition cavity is filled to the desired level with the particulate weld metal 46. The cover 14 of the mold is then closed and the starting material 34 is placed in the depression 36.

In order to initiate the exothermic welding procedure shown in FIGS. 2A and 2B, a flint igniter 50 is positioned relative to the starting material 34 in the depression 36 of the mold cover 14 and is activated to generate a spark to ignite the starting material 34. When the starting material is ignited, it melts and the molten material passes through passage 42 into the weld metal 46 in the ignition cavity 22. This molten starting material 34 then ignites the weld metal 46 which generates substantial heat on ignition and it melts the steel disk 48. This will result in the molten weld metal 46 and melted disk 48 to pass through passage 24 into the weld cavity 16 to weld the cables 18, 19, 21 and 21 together.

Another welding procedure which may be performed by the mold assembly of the present invention is shown in FIGS. 3A-3C. In this procedure, the starting material 34 is also positioned in the depression 36 as previously described. However, in this procedure, ignition is accomplished by an electrical igniter.

Figure 9:
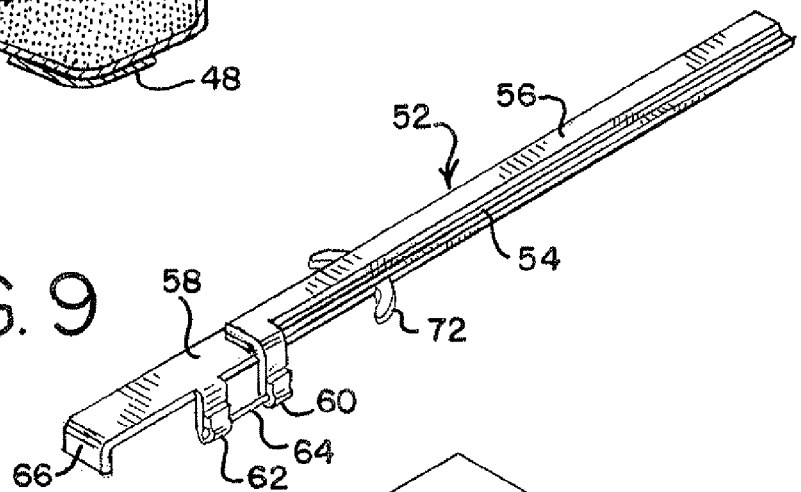
FIG. 9 is an enlarged detailed overall perspective view of the electrical igniter substantially as shown in the preceding figures.

As seen in FIGS. 3A-3C and 9, the electrical igniter 52 is formed by laminating a flat sheet of insulation 54 between two, flat longitudinally extending electrical conductor strips 56 and 58. The insulation may for example be an aromatic polymer such as Nomex which is available from E. I DuPont de Nemours & Co. The conductor strips 56 and 58 are preferably formed of a metal which is a good electrical conductor, such as copper. The upper strip 56 is somewhat narrower in width and is shorter than the bottom strip 58, as best seen in FIG. 9, and for a reason to be described to follow. The upper strip 56 is also shorter than the lower strip 58 which permits the upper strip to terminate in a projection 60 which is spaced from a similar projection 62 formed on the lower strip 58 further toward the end of the igniter. A wire filament 64 is held by the spaced projections 60 and 62 and extends between them. The filament 64 is formed of a material which gets sufficiently hot when an electrical current is passed through the filament to ignite the starter material 34. The filament material may for example be stainless steel or tungsten.

A tab 66 is also preferably formed on the end of the lower conductor strip 58. The tab 66 in addition to other functions as will be described in other welding procedures to follow, serves to act as a positioning element by engaging the projection 40 in the groove 38 as seen in FIG. 3C to thereby insure that the filament 64 is properly positioned relative to the starting material 34 before ignition.

In order to accommodate the electrical igniter 52, passage 68 is formed in the cover 14 as best seen in FIGS. 3A-3C which extends at a substantial angle to the elongate axis a-a of the mold M. The passage 68 opens to a side of the mold cover 14 and extends through the mold cover to the depression 36 in which the starting material 34 is positioned. The passage 68 preferably takes the shape of an inverted T as best seen in FIG. 3B having a narrower portion 69 opening to the top of the mold cover 14 and a wider portion 70 at the bottom. This permits the wider lower conductive strip 58 to be positioned in the wider portion 70 of the passage 68 and the narrower upper conductor strip 56 in the narrower portion 69 of the passage. This stabilizes the conductor 52 against both vertical as well as lateral movement and insures that the filament 64 is always properly positioned in the starter material 34 and not too far above it to accomplish its ignition function. It will also be appreciated that in the alternative the conductive strips 56 and 58 and the sheet or strip of insulation 54 may all be of the same width in which case they will all be positioned in the wider portion 70 of the passage 68.

The passage 68 also preferably includes a still wider portion 71 adjacent its end at and opening to the depression 36. This still wider portion receives tabs 72 which extend from the lower wider conductor strip 58 as best seen in FIG. 9 and which have a principal function to be described later with regard to still another welding procedure. Positioning of the tabs 72 in the still wider portion 71 of the passage 68 also assists in the positioning and holding of the igniter and the filament 64 relative to the starting material 34, and also permits the use of a single igniter construction to be used in all of the welding procedures to be described herein and which are initiated electrically.

To perform the welding procedure shown in FIGS. 3A-3C, the initial steps are again taken as described with respect the procedure shown in FIGS. 2A-2B up to ignition. Once the procedure is ready for ignition, the right end of the electrical conductor 52 opposite the filament 64 is inserted from the left as viewed in FIG. 3C into the narrower and wider elongate passages 69 and 70 and slid horizontally to the right. The projections 60 and 62 and filament 64 will pass the projection 40 through the space 41, the tab 66 will come to rest against the projection 40, and the tabs 72 will be positioned in the wider portion 71 of the passage 68 as seen in FIGS. 3A and 3C. At this point the right end of the conductor extends from the side of the mold cover 14 to its outside where it can be coupled to a suitable power source to provide the electrical current necessary for ignition.

At this point, the electrical igniter 52 and its filament 64 have been properly positioned to commence the welding procedure shown in FIGS. 3A-3C and the igniter is held in this position in the passage 68. Electrical power is then transmitted through the conductors 56 and 58 to heat the filament 64 and ignite the starting material 34. From there on, the procedure is identical to the procedure described with respect to FIGS. 2A-2B.

Still another welding procedure which may be performed by the mold assembly of the present invention is shown in FIGS. 4A-4B.

As in the previous procedures, the particulate weld metal 46 is contained in the ignition cavity 22. However, in this welding procedure the electrical igniter 52 as previously described with respect to FIGS. 3A-3C and 9 extends through an elongate passage 73 between the top of the lower mold half 10 of the mold M and the bottom of the cover 14 between the ignition cavity 22 and through the side of the mold and at a substantial angle to the elongate axis a-a of the mold M as seen in FIG. 4B.

To perform this welding procedure as shown in FIG. 4A-4B, the initial steps are identical to those previously described, except that the starting material in the depression 36 and the placement of the electrical igniter 52 through the passage 68 are eliminated. Instead the electrical igniter 52 is positioned in the passage 73 so that its forward end with the filament 64 is located directly in the weld metal 46 and the other end of the electrical igniter 52 extends to outside of the mold M where it may be coupled to a suitable electrical energy source to energize the igniter 52. In this procedure the portions of the igniter 52 which are in the ignition cavity 22 also melt when the weld metal 46 melts, and together with the molten weld metal flow through passage 24 and into the weld cavity 16 to become part of the weld.

Still another welding procedure which the mold assembly of the present invention is capable of accommodating is shown in FIGS. 5A-5B. In this welding procedure, instead of positioning the particulate weld metal 46 and igniter 52 freely in the ignition cavity 22 as in the procedure shown in FIGS. 4A-4B, the weld metal and filament end of the igniter are contained in a preconstructed cartridge 74 having side walls 76 and a bottom wall 78 which define a container 79 having a chamber 80 therein. The container 79 is preferably constructed and sized to fit into the ignition cavity 22 as shown in FIG. 5B and the weld metal 46 and filament end of the igniter 52 are contained in its chamber 80. The container side walls 76 and bottom wall 78 are preferably formed of a material which melts with the weld metal 46 and therefore is removed from the ignition cavity 22 and becomes part of the weld in the weld cavity 16 leaving little if any residue in the ignition cavity 22 after the welding procedure is completed. Such meltable material may for example be copper metal. As previously mentioned, the filament end of the igniter 52 which is in the container also melts with the molten weld metal and becomes part of the weld in the weld cavity 16.

Figure 8:
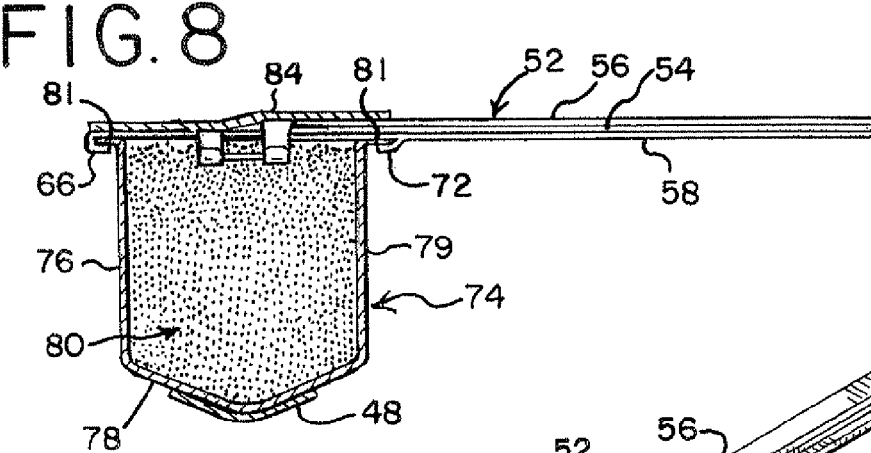
FIG. 8 is a cross sectioned enlarged elevation view of the cartridge container and igniter substantially as shown in FIGS. 5B and 6B.

To assemble the cartridge 74 the chamber 80 of the cartridge is preferably substantially filled with the particulate weld metal 46. The electrical igniter 52 is then positioned on the top of the container 79 with the filament 64 in the particulate weld metal 46, and the igniter is fixed to a laterally extending rim 81 which preferably extends annularly around the top of the container 79 by crimping the tab 66 at the end of the lower conductor strip 56 under the rim 81 as seen in FIGS. 5B and 8. The electrical igniter 52 also preferably includes tabs 72 as previously discussed which are spaced from the tab 66 and also project from the lower conductor strip 58 as best seen in FIG. 9. Tabs 72 are also positioned to be inserted under the container rim 81 at the opposite side of the container 79 from the tab 66. Thus, the tabs 66 and 72 firmly hold the electrical igniter 52 in position on the container 79 and so that the projections 60 and 62 and igniter filament 64 are located in the weld metal 46. In order to complete the cartridge 74, the container 79 and its chamber 80 are covered with a cover 84 to prevent loss of the weld metal 46 during shipping and handling. The cover 84 may comprise a suitable film, such as aluminum foil, polymer or the like, which will also be consumed during the welding procedure and passed with the molten weld metal 46 and container side walls 76 and bottom wall 78 into the weld cavity 16 to become part of the weld.

The welding procedure as shown in FIGS. 5A-5B is essentially identical to that described with respect to FIGS. 4A-4B, except that the weld metal 46 and electrical igniter 52 are contained within the preconstructed cartridge 74 and its container 80. Accordingly, all that is needed to perform the welding procedure of FIGS. 5A-5B after the cables 18, 19, 21 and 21 are positioned in the weld cavity 16 and the mold halves 10 and 12 are clamped together, is to place the cartridge 74 into the ignition cavity 22 so that the portion of the igniter 52 outside of the container 80 extends from the ignition cavity 22 through the passage 73 to the outside of the mold M. The mold cover 14 is then closed, the end of the igniter 52 is coupled to a suitable source of electrical energy and the igniter 52 is energized.

Although the container 79 and its side wall 76 and bottom wall 78 as seen in FIGS. 5A-5B and 8 may be formed of a material such as a copper metal which readily melts and is consumed during the ignition of the weld metal 46 to become part of the weld in the weld cavity 16, it is preferred that a steel plate such as a disk 48 also be positioned adjacent the bottom of the container 79 as seen in FIGS. 5B and 8. The reason that the additional steel disk 48 is preferred is that it slows the initial discharge of the weld metal 46 through passage 24 at the beginning of ignition because it has a higher melt temperature than the copper metal in the container walls and bottom. This permits the temperature of the molten weld metal to be higher and produce better slag ($Al_2O_3$) separation when it finally melts the disk 48 and is discharged into the passage 24 and weld cavity 16. This results in a more homogenous mix of the various materials of the container 79, igniter 52 and weld metal 46 in the final weld and improves the quality of the weld in the weld cavity 16. Although the disk 48 is shown fixed to the bottom 78 of the container 79, in the alternative it may itself form the bottom of the container 79, or it may be separate from the bottom 78 of the container 79 and be placed in the bottom of the ignition cavity 22 followed by the cartridge 74.

The welding procedure shown in FIGS. 6A-6B is essentially identical to the procedures described for FIGS. 5A and 5B. The only difference is that the procedure shown in FIGS. 6A and 6B is a smokeless procedure in which the mold cover 14 accommodates a filter F in the chamber 44 in the mold cover 14 between the ignition cavity 22 and the vent passage 28 in the mold cover 14 as best seen in FIG. 6B. The filter F traps most of the emissions created in the exothermic welding process while allowing the heated air to escape through the filter.

Although the smokeless procedure shown in FIGS. 6A-613 is shown as employed with the procedure shown in FIGS. 5A-5B utilizing the cartridge 74, it will be appreciated that it also may be employed with the procedure shown and described in FIGS. 4A-4B where the weld metal 46 is positioned loosely in the ignition cavity 22 and not in a cartridge.

The construction and welding procedure and mold assembly shown in FIGS. 7A-7C are substantially the same as that described with respect to FIGS. 2A-2B. In both procedures, the starting material 34 is positioned in the depression 36 in the mold cover 14. However, unlike FIGS. 2A-2B in which the igniter 52 is positioned in the passage 68 which is formed in the mold cover 14, the igniter 52 in FIGS. 7A-7C extends through a passage 85 formed in the bottom of a block 86 which is fastened to the top surface 87 of the mold cover 14 by suitable fasteners 88. The block 86 may be formed of any suitable material that is capable of withstanding the heat to which it may be exposed during the welding procedure, such as anodized aluminum. The block 88 firmly holds the igniter against the top surface 87 of the mold and against lateral or vertical movement and it positions the filament 64 in the mold depression 36 and starter material 34. The passage and block arrangement shown in FIG. 7A-7C have the advantage of being somewhat simpler to form the passage through which the igniter 52 is to extend.

Figure 10:
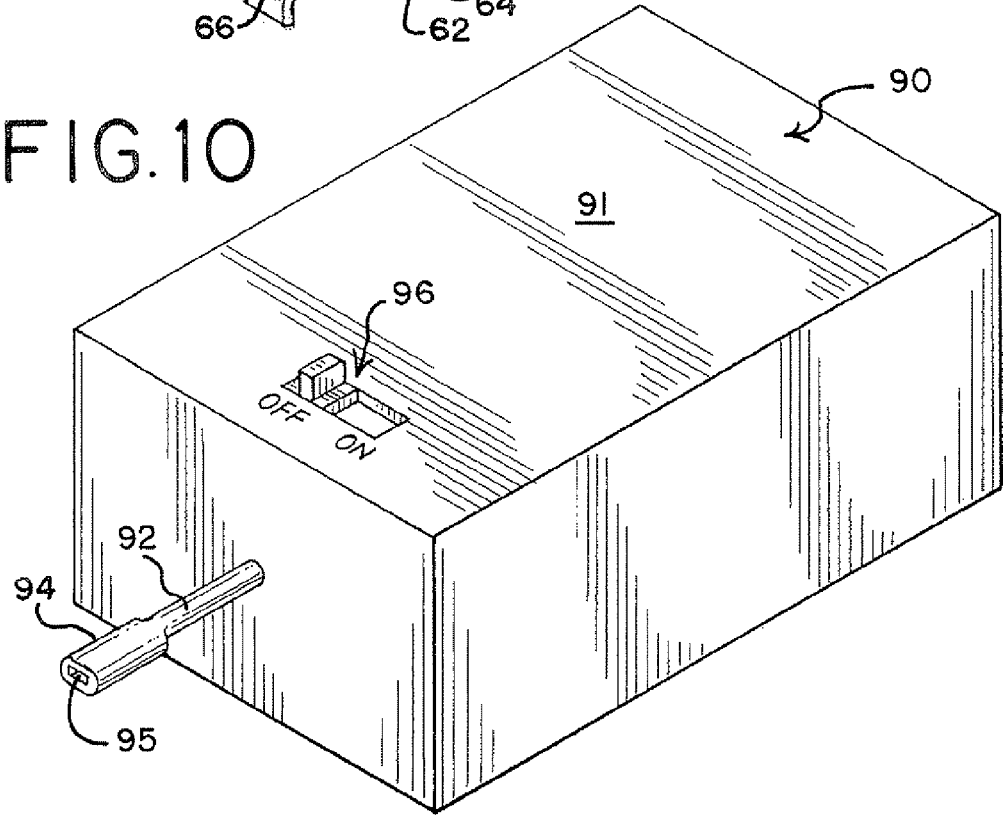
FIG. 10 is an overall perspective view of a preferred embodiment of electrical power source for firing the electrical igniter to initiate the exothermic reaction.

A suitable power supply 90 is shown in FIG. 10 which generally comprises a housing 91 with a battery (not shown) therein. An electrical connector 92 extends from the housing 91 which is electrically connected to the battery and has an external coupling 94 having a socket 95 which receives the distal end of the electrical igniter 52 to transmit electrical energy to the igniter and its filament 64. To energize the igniter 52 to ignite either the starting material 34 or the weld metal 46, a switch 96 is provided to turn on and off the electrical power to the socket 95.

Upon consideration of the foregoing description of the invention, it will be appreciated that the exothermic welding assembly of the present invention has the capability of accommodating multiple different exothermic welding procedures through the use of a single mold assembly, thus greatly simplifying the exothermic welding procedure and reducing the need for inventory of multiple molds unique to the various exothermic welding procedures. It will also be appreciated that in the welding procedures in which the cartridge 74 is provided, the handling of the particulate weld metal and igniter is facilitated and the proper placement of the igniter is assured together with efficient and consistent functioning of the welding procedures. Moreover, the cartridge 74, although capable of being consumed and cleared from the ignition cavity during the exothermic welding process with little or no residue or debris, also may be formed or used in conjunction with the disk 48 improve the quality of the final weld.

It will also be understood that the preferred embodiments of the present invention which have been described are merely illustrative of the principles of the invention. Numerous modifications may be made by those skilled in the art without departing from the true spirit and scope of the invention.

The invention claimed is:

1. An exothermic welding assembly, comprising:
a mold formed of a material which withstands exothermic welding temperatures and having an elongate axis, said mold comprising a first portion having a first cavity therein for positioning at least two members adjacent each other which are to be exothermically welded together, and a second portion comprising a mold cover having a top side and at least one side extending at a substantial angle to said top side;
a second cavity in said mold for containing a weld metal, said second cavity communicating with said first cavity and having a first vent passage extending therefrom to the exterior of said mold to vent gases from said second cavity;
a depression in said mold cover for containing a starting material for the initiation of the reaction of the weld metal, said depression in said mold cover opening to said top side of said mold cover, and a second passage between said depression and said second cavity in the mold to communicate the starting material when ignited with the weld metal in said second cavity; and
a third passage associated with said mold cover and extending at a substantial angle from said one side of said mold cover toward said elongate axis of the mold such that said third passage intersects said depression, wherein a combination of said third passage and said depression extends across at least a substantial portion of width of said mold cover.

2. The assembly of claim 1, wherein said third passage is constructed and arranged to receive an electrical igniter and contain it in said third passage so that the igniter can extend from outside of said mold into said depression.

3. The assembly of claim 1, wherein said third passage extends along said top side of said cover and from said one side of said mold cover toward said depression.

4. The assembly of claim 3, wherein said third passage is constructed and arranged to receive an electrical igniter and contain it in said third passage so that the igniter can extend from said one side of said mold cover into said depression.

5. The assembly of claim 1, including a fourth passage which extends at a substantial angle to said elongate axis from a side of said mold and toward said elongate axis between said first portion of said mold and said cover and from said side of said mold and into said second cavity.

6. The assembly of claim 5, wherein said fourth passage is constructed and arranged to receive an electrical igniter and contain it in said fourth passage so that the igniter can extend from outside of said mold into said second cavity and the weld metal therein.

7. The assembly of claim 5, including:
a container in said second cavity in said mold and containing said weld metal; and
an electrical igniter having one end positioned in said container and in the weld metal therein, and the other end extending laterally from the container and through said fourth passage to the outside of said mold.

8. The assembly of claim 7, including a cover on said container, said igniter extending laterally from said container and from beneath said cover.

9. The assembly of claim 1, including a filter in said mold between said second cavity and said first vent passage.

* * * * *